United States Patent [19]

Gladrow et al.

[11] 4,376,039
[45] Mar. 8, 1983

[54] HYDROCARBON CONVERSION CATALYSTS AND PROCESSES UTILIZING THE SAME

[75] Inventors: Elroy M. Gladrow, Sun City, Ariz.; William E. Winter; William L. Schuette, both of Baton Rouge, La.

[73] Assignee: Exxon Research and Engineering Co., Florham Park, N.J.

[21] Appl. No.: 344,865

[22] Filed: Feb. 1, 1982

Related U.S. Application Data

[62] Division of Ser. No. 196,191, Oct. 10, 1980, Pat. No. 4,339,354.

[51] Int. Cl.$^3$ .............................................. C10G 11/05
[52] U.S. Cl. .................................... 208/120; 208/164
[58] Field of Search ......................................... 208/120

[56] References Cited

U.S. PATENT DOCUMENTS 3,210,267 10/1965 Plank et al. ........................ 208/120
3,402,996 12/1966 Maher et al. ...................... 252/455 Z
3,607,043 11/1969 McDaniel et al. ............... 208/120 X
3,676,368 7/1972 Scherzer et al. ....................... 423/49
3,957,623 5/1976 McDaniel et al. ................... 208/120
4,252,632 2/1981 Mooi .................................. 208/120
4,259,212 3/1981 Gladrow et al. ............... 208/120 X

*Primary Examiner*—Delbert E. Gantz
*Assistant Examiner*—G. E. Schmitkons
*Attorney, Agent, or Firm*—Marthe L. Gibbons

[57] ABSTRACT

A catalyst, having a specified amount of rare earth metal content and a specified amount of alkali metal content, suitable for conversion of hydrocarbon oils to lower boiling products comprises a crystalline aluminosilicate zeolite, such as zeolite Y, an inorganic oxide matrix and, optionally discrete particles of alumina dispersed in the matrix. The zeolite prior to being composited with the matrix has a unit cell size above about 24.5 Angstroms. A cracking process utilizing the catalyst is also provided.

15 Claims, No Drawings

HYDROCARBON CONVERSION CATALYSTS AND PROCESSES UTILIZING THE SAME

This is a division of application Ser. No. 196,191, filed Oct. 10, 1980, now U.S. Pat. No. 4,339,354.

BACKGROUND OF THE INVENTION

1. Field of the Invention

The present invention relates to a catalyst and its use in a catalytic cracking process. More particularly, the present invention relates to a catalytic cracking catalyst having improved activity and selectivity for producing high octane number naphtha.

2. Description of the Prior Art

Hydrocarbon conversion catalysts comprising a zeolite dispersed in a siliceous matrix are known. See, for example U.S. Pat. No. 3,140,249 and U.S. Pat. No. 3,352,796.

A catalyst comprising a zeolite, an inorganic oxide matrix and inert fines, which may be alpha alumina, is known. See. U.S. Pat. No. 3,312,615.

A catalyst comprising an amorphous silica-alumina, separately added alumina and a zeolite is known. See U.S. Pat. No. 3,542,670.

A catalyst comprising a zeolite, an amorphous hydrous alumina and alumina monohydrate is known. See U.S. Pat. No. 3,428,550.

To improve the steam and thermal stability of zeolites, it is known to produce zeolites having a low level of alkali metal content and a unit cell size less than about 24.45 Angstroms. See U.S. Pat. No. 3,293,192 and U.S. Pat. No. Re 28,629 (Reissue of U.S. Pat. No. 3,402,996).

It is also known to treat hydrogen or ammonium zeolite with H$_2$O at a temperature ranging from about 800° to about 1500° F., and subsequently cation exchanging the steam and water treated zeolite with cations which may be rare earth metal cations. The method increases the silica to alumina mole ratio of the zeolite. See U.S. Pat. No. 3,591,488.

U.S. Pat. No. 3,676,368 discloses a rare earth exchanged-hydrogen faujasite containing from 6 to 14 percent rare earth oxides.

U.S. Pat. No. 3,957,623 discloses a rare earth exchanged zeolite having a total of 1 to 10 weight percent rare earth metal oxide.

U.S. Pat. No. 3,607,043 discloses a process for preparing a zeolite having a rare earth content of 0.3 to 10 weight percent.

U.S. Pat. No. 4,036,739 discloses hydrothermally stable and ammonia stable Y zeolite in which a sodium Y zeolite is ion exchanged to partially exchange sodium ions for ammonium ions, followed by steam calcination and a further ion exchange with ammonium to reduce the final sodium oxide content to below 1 weight percent, followed by calcination of the reexchanged product, or according to U.S. Pat. No. 3,781,199, the second calcination may be conducted after the zeolite is admixed with a refractory oxide.

SUMMARY OF THE INVENTION

In accordance with the invention there is provided, a catalyst comprising:

(a) a crystalline aluminosilicate zeolite having uniform pore diameters ranging from about 6 to about 15 Angstroms and a silica to alumina mole ratio of at least about 3;

(b) an inorganic oxide matrix; and (c) discrete particles of alumina;

said zeolite prior to being composited with (b) having a unit cell size greater than about 24.5 Angstroms, and said catalyst having an alkali metal content such that the ratio of weight percent alkali metal, calculated as the alkali metal oxide, based on the total catalyst, divided by the weight percent zeolite based on the total catalyst is not greater than 0.024 and a rare earth metal content such that the ratio of weight percent rare earth metal, calculated as the rare earth metal oxide, based on the total catalyst, divided by the weight percent zeolite based on the total catalyst ranges from about 0.01 to about 0.08.

In accordance with the invention there is further provided a catalytic cracking process utilizing the above stated catalyst.

DETAILED DESCRIPTION OF THE INVENTION

The catalyst of the present invention must have (1) an alkali metal content such that the ratio of weight percent alkali metal oxide based on the total catalyst divided by the weight percent zeolite based on the total catalyst is not more than about 0.024, preferably not more than about 0.013 and (2) a rare earth content such that the ratio of weight percent rare earth metal oxide based on the total catalyst divided by the weight percent zeolite based on the total catalyst ranges from about 0.01 to 0.08, preferably from about 0.01 to about 0.06, more preferably from about 0.01 to about 0.04.

The alkali metal in the catalyst can be a single alkali metal or a mixture of alkali metals. The rare earth metal may be a single rare earth metal or a mixture of rare earth metals of elements having atomic numbers ranging from 57 to 71.

The required amount of rare earth metal and alkali metal can be incorporated into the catalyst either by preparing a zeolite having the required rare earth content and alkali metal content and then compositing the zeolite with a conventional matrix or the required amount of rare earth and alkali metal in the catalyst can be obtained by utilizing a zeolite having essentially no rare earth metal cations, that is, less than 1 weight percent rare earth oxide based on the zeolite, or less than the required amount of rare earth metal and subsequently treating the composite catalyst (that is, zeolite dispersed in a matrix) with a solution comprising rare earth metal components to incorporate the required amount of rare earth metal components into the catalyst.

THE ZEOLITE COMPONENT

The initial zeolite component of the catalyst of the present invention prior to being composited with the other components can be any of the large pore crystalline aluminosilicate zeolites having uniform pore openings ranging from about 6 to about 15 Angstroms and a silica to alumina mole ratio of at least about 3. Examples of these zeolites are zeolites designated by the Linde Division of Union Carbide by the letter Y (this zeolite has the structure of a faujasite and is described in U.S. Pat. No. 3,120,017) as well as naturally occurring faujasites. The preferred initial zeolite is a Y-type zeolite. The unit cell size of the initial zeolite used prior to compositing it with the other components is greater than 24.5 Angstroms, preferably greater than about 24.6 Angstroms.

The zeolite may comprise rare earth metal cations and may additionally comprise hydrogen cations and cations of Group IB to VIII metals of the Periodic Table of Elements. The Periodic Table referred to herein is given in *Handbook of Chemistry and Physics*, published by the Chemical Rubber Company, Cleveland, Ohio, 45th Edition, 1964. When additional cations are present other than rare earth metals and alkali metals, the preferred additional cations are calcium, magnesium, hydrogen and mixtures thereof. The concentration of hydrogen present in the finished zeolite will be that concentration equivalent to the difference between the theoretical cation concentration of the particular zeolite in question and the amount of cation present in the form of, for example, rare earth and residual ion.

When the rare earth content and low alkali metal of the catalyst are controlled by utilizing a zeolite which has been treated to comprise at least a portion of the required rare earth metal, for example, as rare earth metal cations, the zeolite having the desired rare earth metal component can be obtained by various methods.

One method of producing a required zeolite having only a limited amount of rare earth metal cations and low alkali metal content is to start with a sodium Y-type zeolite having a unit cell size greater than 24.5 Angstroms and ion exchange it with an ammonium ion by a conventional method known in the art such as for example, by utilizing an ammonium salt in an aqueous or non-aqueous fluid medium. Ion exchange methods are described, for example, in U.S. Pat. No. 3,140,249; U.S. Pat. No. 3,140,251; U.S. Pat. No. 3,140,253, the teachings of which are hereby incorporated by reference. Although a wide variety of salts can be employed, particular preference is given to chlorides, nitrates, and sulfate. The ion exchange treatment is conducted for a time sufficient to replace enough of the alkali metal cation by ammonium to decrease the alkali metal content of the zeolite to a desired value. The ammonium treatment may be a single treatment or a successive number of treatments. If desired, the treated zeolite can be washed between successive ammonium treatments. The resulting ammonium exchanged zeolite is recovered, for example, by filtration. The recovered zeolite is washed with water to remove soluble matter. The ammonium exchanged Y zeolite is contacted with a fluid medium comprising rare earth metal cations of a single rare earth metal or cations of a mixture of rare earth metals. The ion exchange is conducted in a conventional way such as by utilizing salts of the desired rare earth metals. The rare earth metal treatment additionally replaces some of the remaining alkali metal cations of the zeolite and may replace some of the ammonium ions.

The amount of rare earth metal used is such that it does not exceed the limits of the range required for the catalyst of the present invention. The total amount of required rare earth may be exchanged into the zeolite itself or only a portion of the amount required by the catalyst of the present invention may be exchanged into the zeolite and the balance of the desired required amount may be composited with the finished catalyst, for example, by posttreating the finished catalyst with a solution comprising rare earth metal components that become associated with the finished catalyst.

The rare earth-exchanged zeolite is recovered, for example, by filtration, and washed with water to remove soluble matter and calcined, for example, at a temperature ranging from about 1300° F. to 1600° F. for about 0.5 to 6 hours, preferably from about 1400° F. to 1500° F. for about 1 to 3 hours in the absence or in the presence of $H_2O$ which may be steam or water.

The final zeolite may be composited with other catalytic metal components, such as metals of Groups IIA, IIIA, IVA, IB, IIB, IIIB, IVB, VIB, and VIII of the Periodic Table of Elements.

The particle size of the zeolite component will generally range from about 0.1 to 10 microns, preferably from about 0.5 to 3 microns. Suitable amounts of the zeolite component in the total catalyst will range from about 1 to 60, preferably from about 1 to 40, more preferably from about 5 to 40, most preferably from about 8 to 35 weight percent, based on the total catalyst.

THE ALUMINA COMPONENT

The catalyst of the present invention, optionally, comprises a porous alumina component. The porous alumina component is present in the preferred catalyst of the present invention.

The porous alumina component of the catalyst of the present invention comprises discrete particles of various porous aluminas, preferably crystalline alumina, which are known and commercially available. In general, the porous alumina component of the catalyst of the present invention are discrete particles having a total surface area, as measured by the method of Brunauer, Emmett and Teller (BET) greater than about 20 square meters per gram ($m^2/g$), preferably greater than 145 $m^2/g$, for example, from about 145 to 300 $m^2/g$. Preferably the pore volume (BET) of the alumina will be greater than 0.35 cc/g. The average particle size of the alumina particles would generally be less than 10 microns, preferably less than 3 microns. Preferably, the porous alumina will be a material having initially, if used alone, prior to being composited with the other components, inherently less catalytic cracking activity of its own than the inorganic matrix component of the catalyst. Preferably, the porous alumina will be a bulk alumina. The term "bulk" with reference to the porous alumina is intended herein to designate a material which has been preformed and placed in a physical form such that its surface area and pore structure are stabilized so that when it is added to an impure, inorganic gel containing considerable amounts of residual soluble salts, the salts will not alter the surface and pore characteristics measurably nor will they promote chemical attack on the preformed porous alumina which could undergo change. For example, addition of "bulk" alumina will mean use of a material which has been formed by suitable chemical reaction, the slurry aged, filtered, dried, washed free of residual salt and then heated to reduce its volatile content to less than about 15 weight percent. The porous alumina component may suitably be present in the catalyst of the present invention in an amount ranging from about 5 to about 40 weight percent, preferably from about 10 to about 30 weight percent based on the total catalyst. Alternatively and optionally, an alumina hydrosol or hydrogel or hydrous alumina slurry may be used initially in the catalyst preparation as precursor of the discrete particles of alumina in the final catalyst.

THE INORGANIC OXIDE MATRIX COMPONENT

The inorganic oxide matrices suitable as component of the catalyst of the present invention are amorphous catalytic inorganic oxides, such as silica, alumina, silica-alumina, silica-zirconia, silica-magnesia, alumina-boria, alumina-titania and the like and mixtures thereof. Preferably, the inorganic oxide matrix is a silica-containing gel; more preferably the inorganic oxide gel is an amorphous silica-alumina component such as a conventional silica-alumina cracking catalyst, several types and compositions of which are commercially available. These materials are generally prepared as a cogel of silica and alumina or as alumina precipitated on a preformed and preaged hydrogel. In general, the silica is present as a major component in the catalytic solids present in said gels, being present in amounts ranging from about 55 to 100 weight percent; preferably the silica will be present in amounts ranging from about 70 to about 90 weight percent. Particularly preferred are two cogels, one comprising about 75 weight percent silica and 25 weight percent alumina and the other comprising about 87 weight percent silica and 13 weight percent alumina. The inorganic oxide matrix component may suitably be present in the catalyst of the present invention in an amount ranging from about 40 to about 99 weight percent, preferably from about 50 to about 80 weight percent, based on the total catalyst. It is also within the scope of this invention to incorporate in the catalyst other materials, to be employed in cracking catalysts such as various other types of zeolites, clays, carbon monoxide oxidation promoters, etc.

The catalyst of the present invention may be prepared by any one of several methods. The preferred method of preparing one of the catalysts of the present invention, that is, a catalyst comprising silica-alumina and porous alumina, is to react sodium silicate with a solution of aluminum sulfate to form a silica/alumina hydrogel slurry which is then aged to give the desired pore properties, filtered to remove a considerable amount of the extraneous and undesired sodium and sulfate ions and then reslurried in water. Separately, the bulk alumina is made, for example, by reacting solutions of sodium aluminate and aluminum sulfate under suitable conditions, aging the slurry to give the desired pore properties of the alumina, filtering, drying, reslurry in water to remove sodium and sulfate ions and drying to reduce volatile matter content to less than 15 weight percent. The alumina is then slurried in water and blended in proper amounts, with a slurry of impure silica-alumina hydrogel.

The zeolite component is added to this blend. A sufficient amount of each component is utilized to give the desired final composition. The resulting mixture is then filtered to remove a portion of the remaining extraneous soluble salts therefrom. The filtered mixture is then dried to produce dried solids. The dried solids are subsequently reslurried in water and washed substantially free of the undesired soluble salts. The catalyst is then dried to a residual water content of less than about 15 weight percent. The catalyst is recovered after calcination for 6 hours at 1000° F. in air. The catalyst of the present invention is particularly suited for use in catalytic cracking of hydrocarbons.

Catalytic cracking with the catalyst of the present invention can be conducted in any conventional catalytic cracking manner. Suitable catalytic cracking conditions include a temperature ranging from about 700° F. to about 1300° F. and a pressure ranging from about subatmospheric to several hundreds of atmospheres, typically from about atmospheric to about 100 psig. The process may be carried out in a fixed bed, moving bed, ebullating bed, slurry, transferline, or fluidized bed operation. The catalyst of the present invention can be used to convert any of the conventional hydrocarbon feeds used in catalytic cracking, that is, it can be used to crack naphthas, gas oil and residual oils having a high content of metal contaminants. It is especially suited for cracking hydrocarbons boiling in the gas oil range, that is, hydrocarbon oils having an atmospheric pressure boiling point ranging from about 450° to about 1100° F. to naphthas to yield not only products having a lower boiling point than the initial feed but also products having an improved octane number.

DESCRIPTION OF THE PREFERRED EMBODIMENT

The following examples are presented to illustrate the invention.

PREPARATION OF THE ZEOLITE COMPONENT

A zeolite suitable as component of the catalyst of the present invention was made as follows:

(1) In a mixing tank, slurry 22 lbs of sodium Y zeolite in 100 lbs of water heated to 135° F.

(2) With stirring and continued heating, add 5 lbs of $(NH_4)_2SO_4$. Continue to heat and stir at 135° F. for 2 hours, filter and rinse the filter cake with 2 gallons of hot water. (A portion of the material was analyzed and showed 7.06 percent residual sodium oxide).

(3) In a mixing vessel, 100 lbs of water are heated to 135° F. and 5 lbs of ammonium sulfate dissolved in it. The pH of the solution was lowered to 4.0 by addition of sulfuric acid. With stirring and heating continued at 135° F., the wet filter cake was added and contacted for 2 hours, filtered and rinsed with 2 gallons of hot water. A sample of this material analyzed 4.60 weight percent sodium oxide.

(4) In a separate vessel charged 75 lbs of water, slurry the wet filter cake of (3) and heat the slurry to 135° F. With continued heating and stirring, add 850 cc of a solution of mixed rare earth chlorides (equivalent to 360 grams $RE_2O_3$). Contact time was 1 hour. Filter and rinse with 3 gallons of hot water. A sample of this material analyzed 4.48 weight percent sodium oxide and 5.37 weight percent $RE_2O_3$.

(5) A portion of the filter cake was dried and calcined 6 hours at 1000° F. If had a unit cell size of 24.63 Angstroms and showed a crystallinity of 144 percent.

(6) The wet filter cake was placed in a furnace already at 1000° F. and the temperature raised to 1500° F. maintaining 1500° F. for 30 minutes and then allowed to cool to 300° F. A portion of the material was analyzed. It had a unit cell size of 24.60 Angstroms and at a crystallinity of 141 percent. This material is suitable as a zeolite component of the catalyst of the present invention.

EXAMPLE

Comparative cracking experiments were made utilizing catalysts A, B, C, D, E, F and G. Catalysts A, B, C and G are not catalysts in accordance with the invention. Catalysts D, E and F are catalyst of the invention with catalysts D and E being preferred catalysts of the present invention. The compositions of the catalysts are shown in Table I. Catalysts A, B, C, D, E and F comprised about 20 weight percent of a Y-type zeolite, about 20 weight percent of discrete particles of a porous alumina dispersed in about 60 weight percent silica-alumina gel matrix. The Y-type zeolite in catalyst C was an ultrastable type Y zeolite. The same porous alumina and silica-alumina gel were used in the preparation of catalysts A, B, C, D, E and F. Catalyst G was a standard commercially available cracking catalyst comprising about 16 weight percent rare earth metal exchanged Y-type zeolite, dispersed in a mixed matrix of silica-alumina gel and kaolin. The rare earth metal content, calculated as rare earth metal oxide, based on total catalyst of catalyst G was about 3.74 weight percent. Catalyst A, which is not a catalyst of the present invention, was prepared by utilizing NaNH₄Y zeolite which was neither rare earth exchanged nor calcined prior to being composited with the remaining catalyst components. Catalyst B, which is not a catalyst of the present invention, was prepared by utilizing a zeolite prepared from a sodium Y zeolite by direct exchange with rare earth chlorides without a prior ammonium exchange. Catalyst C, which is not a catalyst of the present invention, was prepared from a sodium Y zeolite by ammonium exchange followed by a 1500° F. calcination, followed by another ammonium ion exchange. The resulting zeolite was an ultrastable Y type zeolite. The zeolite of catalyst C was not subjected to rare earth exchange treatment.

Catalysts D, E and F, which are catalysts in accordance with the present invention, were each prepared by utilizing a sodium Y type zeolite which was subjected to ammonium exchange, followed by rare earth metal ion exchange and calcination at 1500° F. Catalysts A, B, C, D, E, and F were post washed, that is, the composite catalysts were washed in the same manner as is well known in the art, to remove residual salts.

Catalysts A, B, C, D, E, F and G were each steamed 16 hours at 1400° F. and 0 psig. The steamed catalysts were then evaluated for cracking activity by a standard microactivity test (MAT). The results of these tests are shown in Table II. The steamed catalysts were also evaluated for cracking performance in a full cycle cracking operation. The unit was operated in a once-through manner, that is, there was no recycle oil mixed with fresh feed. The feedstock used was a 450° to 1100° F. vacuum gas oil. The unit was operated at a constant catalyst to oil ratio of 4. The reactor temperature was 925° F. and the regenerator temperature was 1105° F. The catalysts were compared at a constant feed rate of 10 grams per minute. The results are summarized in Table II.

As can be seen from the data in Table II, the octane number of the naphtha product falls sharply when a catalyst is used in which the rare earth metal oxide content of the catalyst is 0.072 where the rare earth metal content is calculated as the rare earth metal oxide of the total catalyst divided by the weight percent zeolite on total catalyst.

Catalyst G contained a fully rare earth exchanged Y type zeolite, that is, all the exchangeable cationic positions were occupied by rare earth metal cations. Catalysts D, E and F, which are catalysts in accordance with the present invention, had a defined limited amount of rare earth metal components in the total composite catalyst, and exhibited superior activity.

TABLE I

| Catalyst | A | B | C | D | E | F | G |
|---|---|---|---|---|---|---|---|
| Zeolite, wt. % | 20 | 20 | 20 | 20 | 20 | 20 | 16 |
| Alumina, wt. % | 20 | 20 | 20 | 20 | 20 | 20 | — |
| Silica-alumina, wt. % | 60 | 60 | 60 | 60 | 60 | 60 | 60 |
| Kaolin, wt. % | — | — | — | — | — | — | 20 |
| RE₂O₃, wt. %[1] | — | 0.049 | 0 | 0.042 | 0.050 | 0.072 | 0.234 |
| Na₂O, wt. %[2] | 0.041 | 0.024 | 0.010 | 0.008 | 0.012 | 0.010 | 0.038 |

[1]Rare earth metal oxide based on total catalyst divided by wt. % zeolite on total catalyst.
[2]Na₂O based on total catalyst divided by wt. % zeolite on total catalyst.

TABLE II

| Catalyst | A | B | C | D | E | F | G |
|---|---|---|---|---|---|---|---|
| Na₂O, wt. %[1] | 0.041 | 0.024 | 0.010 | 0.008 | 0.012 | 0.010 | 0.038 |
| RE₂O₃, wt. %[2] | 0 | 0.049 | 0 | 0.042 | 0.050 | 0.072 | 0.234 |
| MAT[3] Product Yield Conversion[6] | 54.1 | 58.2 | 54.0 | 68.4 | 70.5 | 74.3 | 65 |
| 430° F. Conversion, vol. % | 35.3 | 71.6 | 52.9 | 63.5 | 63.2 | 71.2 | 62.4 |
| C₅/430° F., vol. % | 33.9 | 61.8 | 47.7 | 59.3 | 59.0 | 65.0 | 58.4 |
| C₃⁻ dry gas, wt. % | 2.3 | 6.2 | 4.7 | 4.6 | 4.0 | 5.3 | 4.5 |
| C₄⁼, vol. % | 3.3 | 8.1 | 6.2 | 5.5 | 6.9 | 6.6 | 4.8 |
| iC₄, vol. % | 0.8 | 5.2 | 1.6 | 2.6 | 3.2 | 4.3 | 3.2 |
| Coke, wt. % | 1.5 | 3.1 | 2.0 | 2.4 | 2.0 | 2.9 | 2.2 |
| C₅/430° F. Octanes | | | | | | | |
| RONC[4] | 91.7 | 92.1 | 93.0 | 92.6 | 92.2 | 90.6 | 89.9 |
| MONC[5] | — | 80.3 | 79.9 | 80.2 | 79.3 | 79.3 | 78.6 |
| (RONC + MONC)/2 | — | 86.2 | 86.4 | 86.4 | 85.7 | 84.9 | 84.2 |

[1]Na₂O based on total catalyst divided by wt. % zeolite on total catalyst.
[2]RE₂O₃ based on total catalyst divided by wt. % zeolite on total catalyst.
[3]MAT is microactivity test. See Oil and Gas Journal, 1966, vol. 64, pages 7, 84, 85 and Nov. 2, 1971, pages 60-68.
[4]Research Octane Number Clear.
[5]Motor Octane Number Clear.
[6]Conversion rate of 10 grams per minute.

What is claimed is:

1. A process for the catalytic cracking of a hydrocarbon feedstock, which comprises: contacting said feedstock at catalytic cracking conditions with a catalyst comprising:
   (a) a crystalline aluminosilicate zeolite having uniform pore diameters ranging from about 6 to about 15 Angstroms, and a silica to alumina mole ratio of at least about 3;
   (b) an inorganic oxide matrix,
   said zeolite prior to being composited with (b) having a unit cell size greater than about 24.5 Angstroms, and said catalyst having an alkali metal content such that the ratio of weight percent alkali metal, calculated as the alkali metal oxide, based on the total catalyst, divided by the weight percent zeolite based on the total catalyst is not greater than 0.024 and a rare earth metal content such that the ratio of weight percent rare earth metal oxide, based on the total catalyst, divided by the weight percent zeolite based on the total catalyst ranges from about 0.01 to about 0.08.

2. The process of claim 1 wherein said alkali metal oxide ratio is not greater than about 0.013.

3. The process of claim 1 or claim 2 wherein said rare earth metal oxide ratio ranges from about 0.01 to about 0.06.

4. The process of claim 1 or claim 2 wherein said rare earth metal oxide ratio ranges from about 0.01 to about 0.04.

5. The process of claim 1 wherein said zeolite prior to being composited with (b) has a unit cell size greater than about 24.6 Angstroms.

6. The process of claim 1 wherein said zeolite is present in an amount ranging from about 1 to about 60 weight percent.

7. The process of claim 1 wherein said zeolite is a Y-type zeolite.

8. The process of claim 1 wherein said catalyst additionally comprises discrete particles of alumina dispersed in said matrix.

9. The process of claim 8 wherein said particles of alumina have a surface area greater than about 20 m²/g and a pore volume greater than about 0.35 cc/g.

10. The process of claim 8 wherein said particles of alumina in themselves have less cracking activity than said inorganic oxide matrix.

11. The process of claim 8 wherein said particles of alumina are present in an amount ranging from about 5 to about 40 weight percent, said zeolite is present in an amount ranging from about 1 to about 40 weight percent and said inorganic oxide matrix is present in an amount ranging from about 40 to about 90 weight percent, each based on the total catalyst.

12. The process of claim 1 wherein said catalytic cracking conditions include a temperature ranging from about 700° to about 1300° F.

13. The process of claim 1 wherein said hydrocarbon feedstock is a gas oil.

14. The process of claim 1 wherein a naphtha product having an increased octane number is recovered.

15. The process of claim 1 wherein said inorganic oxide matrix comprises silica-alumina.

* * * * *